United States Patent
Park et al.

(10) Patent No.: US 9,209,707 B2
(45) Date of Patent: Dec. 8, 2015

(54) THREE-LEVEL PHOTOVOLTAIC INVERTER CONFIGURED FOR ASYMMETRIC CONTROL OF DC-LINK VOLTAGES FOR SEPARATE MPPT DRIVING

(71) Applicants: LG ELECTRONICS INC., Seoul (KR); KOREA ELECTRICAL ENGINEERING & SCIENCE RESEARCH INSTITUTE, Seoul (KR)

(72) Inventors: Yong-Soon Park, Cheongju (KR); Seung-Ki Sul, Seoul (KR); Chun-Ho Lim, Seoul (KR); Seong-Hun Lee, Seoul (KR); Ki-Sung Lee, Seoul (KR)

(73) Assignees: LG ELECTRONICS INC., Seoul (KR); KOREA ELECTRICAL ENGINEERING & SCIENCE RESEARCH INSTITUTE, Seoul (KR)

( * ) Notice: Subject to any disclaimer, the term of this patent is extended or adjusted under 35 U.S.C. 154(b) by 385 days.

(21) Appl. No.: 13/748,811

(22) Filed: Jan. 24, 2013

(65) Prior Publication Data
US 2014/0097687 A1 Apr. 10, 2014

(30) Foreign Application Priority Data
Oct. 9, 2012 (KR) .......................... 10-2012-0111919

(51) Int. Cl.
*H02M 7/483* (2007.01)
*H02M 7/48* (2007.01)
*H02J 3/38* (2006.01)

(52) U.S. Cl.
CPC ................ *H02M 7/48* (2013.01); *H02J 3/385* (2013.01); *H02M 7/483* (2013.01); *Y02E 10/58* (2013.01); *Y10T 307/50* (2015.04)

(58) Field of Classification Search
CPC ........ H02M 7/48; H02M 7/487; H02M 7/483
USPC .......................... 323/906; 363/17, 40, 131, 32
See application file for complete search history.

(56) References Cited

U.S. PATENT DOCUMENTS

| 5,982,646 | A | * | 11/1999 | Lyons et al. | 363/58 |
| 6,307,760 | B1 | * | 10/2001 | Ikimi | 363/39 |
| 8,144,490 | B2 | * | 3/2012 | El-Barbari et al. | 363/43 |
| 8,611,120 | B2 | * | 12/2013 | Okuda et al. | 363/132 |

(Continued)

FOREIGN PATENT DOCUMENTS

| CN | 1141780 C | | 3/2004 |
| JP | 3-26034 A | | 2/1991 |
| JP | 2011083115 | * | 4/2011 |

*Primary Examiner* — Gary L Laxton
*Assistant Examiner* — Kyle J Moody
(74) *Attorney, Agent, or Firm* — Birch, Stewart, Kolasch & Birch, LLP

(57) ABSTRACT

A three-level inverter having two direct current (DC)-links for converting DC voltages generated in a plurality of photovoltaic (PV) modules into alternating current (AC) voltages, wherein one end of a first DC-link of the two DC-links is connected to a first potential point at which a first potential is generated in the plurality of PV modules, and one end of a second DC-link of the two DC-links is connected to a second potential point at which a second potential that is lower than the first potential is generated in the plurality of PV modules, and both the other end of the first DC-link and the other end of the second DC-link are connected to a third potential point at which a third potential having a medium level between the first potential and the second potential is generated in the plurality of PV modules.

18 Claims, 12 Drawing Sheets

(56) References Cited

U.S. PATENT DOCUMENTS 8,750,005 B2 * 6/2014 Fujii et al. .................. 363/98
8,811,049 B2 * 8/2014 Fornage .................... 363/98
2013/0329471 A1 * 12/2013 Escobar et al. ............. 363/40
2014/0198548 A1 * 7/2014 Zhang et al. ............... 363/131
2015/0098251 A1 * 4/2015 Harrison .................... 363/17

* cited by examiner

FIG. 12
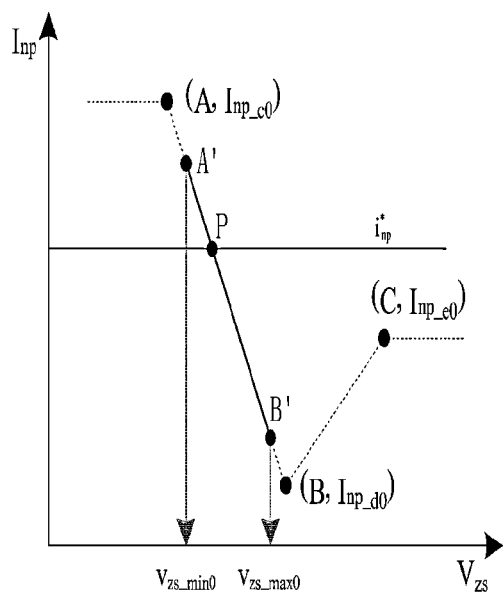
(a) $I_{vmax} > 0$, $I_{vmin} > 0$.
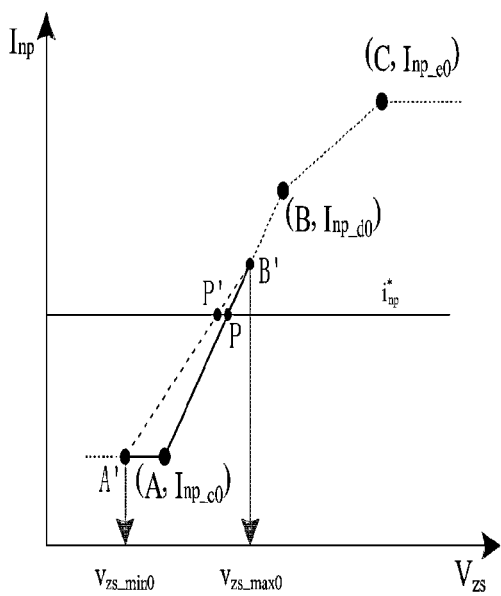
(b) $I_{vmax} < 0$, $I_{vmin} > 0$.

THREE-LEVEL PHOTOVOLTAIC INVERTER CONFIGURED FOR ASYMMETRIC CONTROL OF DC-LINK VOLTAGES FOR SEPARATE MPPT DRIVING

CROSS-REFERENCE TO RELATED PATENT APPLICATION

This application claims the benefit of Korean Patent Application No. 10-2012-0111919, filed on Oct. 9, 2012, in the Korean Intellectual Property Office, the disclosure of which is incorporated herein in its entirety by reference.

BACKGROUND OF THE INVENTION

1. Field of the Invention

The present invention relates to an apparatus and method of controlling a three-level photovoltaic inverter, and more particularly, to a three-level photovoltaic inverter configured to separately control two DC-link voltages and an apparatus and method of controlling the three-level photovoltaic inverter.

2. Description of the Related Art

As energy problems are getting serious due to exhaustion of fossil fuels, the development of power generation systems for new and renewable energy has been accelerated, and among them, a photovoltaic generation system has been highlighted.

The photovoltaic generation system includes a plurality of photovoltaic modules, an inverter, and a controller.

Direct current (DC) power generated in the plurality of photovoltaic modules are converted into alternating current (AC) power by the inverter according to control of the controller and are supplied to a load. The reason why the plurality of photovoltaic modules are used, is that output voltages from one solar cell are very small.

That is, a photovoltaic module, i.e., a PV module is configured by generating one module by connecting several tens of solar cells or several hundreds of solar cells in series as occasion demands and by assembling the module on one panel. Since necessary voltage and power cannot be obtained using one PV module, several PV modules are connected in series or parallel.

Power that can be output by the PV module is non-linear with respect to voltage, as illustrated in FIG. 1. Thus, it is important to supply maximum power from the PV module by control. In this way, control for tracking a maximum power point of the PV module is referred to as maximum power point tracking (MPPT) control.

Output power of the PV module varies according to the intensity of solar light. Shades may occur in part of a plurality of PV modules included in one photovoltaic generation system according to weather conditions. For example, shades of cloud or other obstacles may be generated only in part of the plurality of PV modules.

Likewise, shades that occur only in part of the plurality of PV modules are referred to as 'partial shades'. When partial shades occur, voltage-power characteristics of the PV module are changed.

FIG. 2 is a voltage-power graph of a PV module in which partial shades occur. Comparing FIG. 2 with FIG. 1, one peak is formed in FIG. 1, whereas, several peaks in FIG. 2.

In general, such partial shades occur frequently. Thus, a scheme for controlling maximum power to be supplied in case of partial shades is required. Conventional suggested techniques do not still show satisfactory results for MPPT.

SUMMARY OF THE INVENTION

The present invention provides an inverter in which a photovoltaic (PV) module may supply maximum power even when partial shades occur, and an apparatus and method of controlling the inverter.

According to an aspect of the present invention, there is provided a three-level inverter having two direct current (DC)-links for converting DC power generated in a plurality of photovoltaic (PV) modules into alternating current (AC) power, wherein one end of a first DC-link of the two DC-links is connected to a first potential point at which a first potential is generated in the plurality of PV modules, and one end of a second DC-link of the two DC-links is connected to a second potential point at which a second potential that is lower than the first potential is generated in the plurality of PV modules, and both the other end of the first DC-link and the other end of the second DC-link are connected to a third potential point at which a third potential having a medium level between the first potential and the second potential is generated in the plurality of PV modules.

According to another aspect of the present invention, there is provided an apparatus for controlling the three-level inverter having two DC-links, the apparatus including: two maximum power point tracking (MPPT) for performing MPPT separately on each of the two DC-links to respectively generate DC-link voltage reference values; an arithmetic operation unit for performing a sum operation and a difference operation of each of the DC-link voltage reference values by receiving the DC-link voltage reference values output from the two MPPT performing units; a phase voltage referencing unit for generating each phase voltage reference value based on a value calculated by performing the sum operation of the arithmetic operation unit; an zero sequence voltage referencing unit for generating a reference value of zero sequence voltages based on a value calculated by performing the difference operation of the arithmetic operation unit; and a gate driving unit for generating a final reference value that is obtained by adding the reference value of zero sequence voltages calculated by the zero sequence voltage referencing unit to each phase voltage reference value of the phase voltage referencing unit and for applying a signal using the final reference value to each gate of the switching element of the three-level inverter.

According to another aspect of the present invention, there is provided a method of controlling the three-level inverter having two DC-links, the method including: (a) performing maximum power point tracking (MPPT) separately on each of the two DC-links to respectively generate DC-link voltage reference values; (b) performing a sum operation and a difference operation of each of the DC-link voltage reference values by receiving the DC-link voltage reference values generated in (a); (c) generating each phase voltage reference value based on a value calculated by performing the sum operation of (b); (d) generating a reference value of zero sequence voltages based on a value calculated by performing the difference operation of (b); and (e) generating a final reference value that is obtained by adding the reference value of zero sequence voltages calculated in (d) to each phase voltage reference value calculated in (c) and applying a signal using the final reference value to each gate of the switching element of the three-level inverter.

BRIEF DESCRIPTION OF THE DRAWINGS

The above and other features and advantages of the present invention will become more apparent by describing in detail exemplary embodiments thereof with reference to the attached drawings in which:

FIG. 12 shows several examples of variations in inverter neutral point currents according to output phase current signs;

DETAILED DESCRIPTION OF THE INVENTION

The present invention will now be described more fully with reference to the accompanying drawings, in which exemplary embodiments of the invention are shown.

Figure 1:
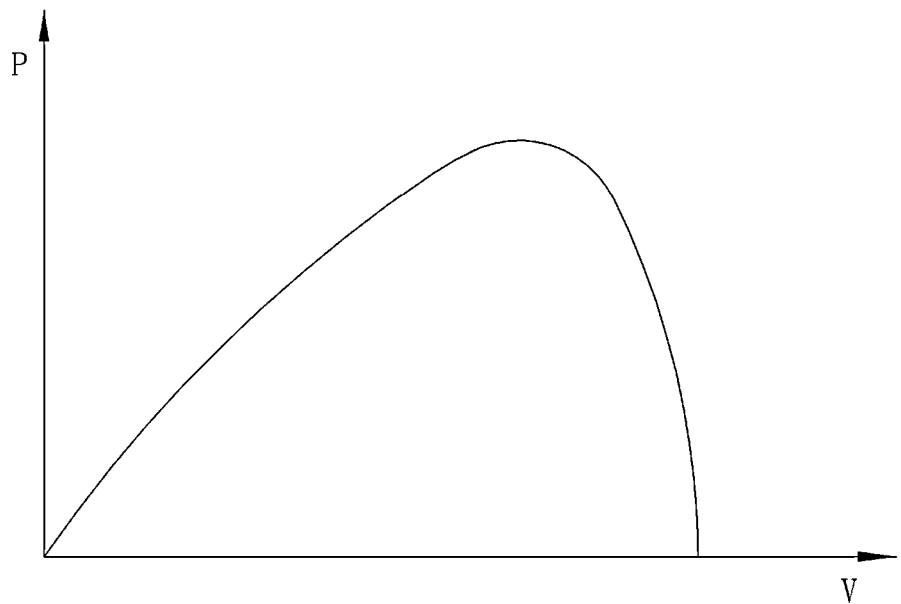
FIG. 1 is a voltage-power characteristic curve of a photovoltaic (PV) module.
Figure 2:
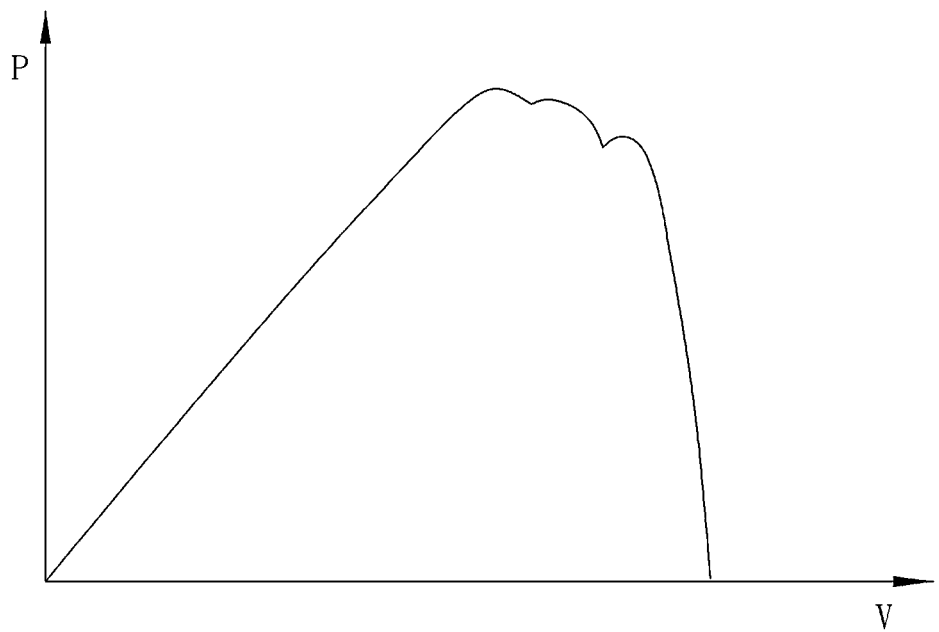
FIG. 2 is a voltage-power characteristic curve of PV modules when partial shades occur.
Figure 3:
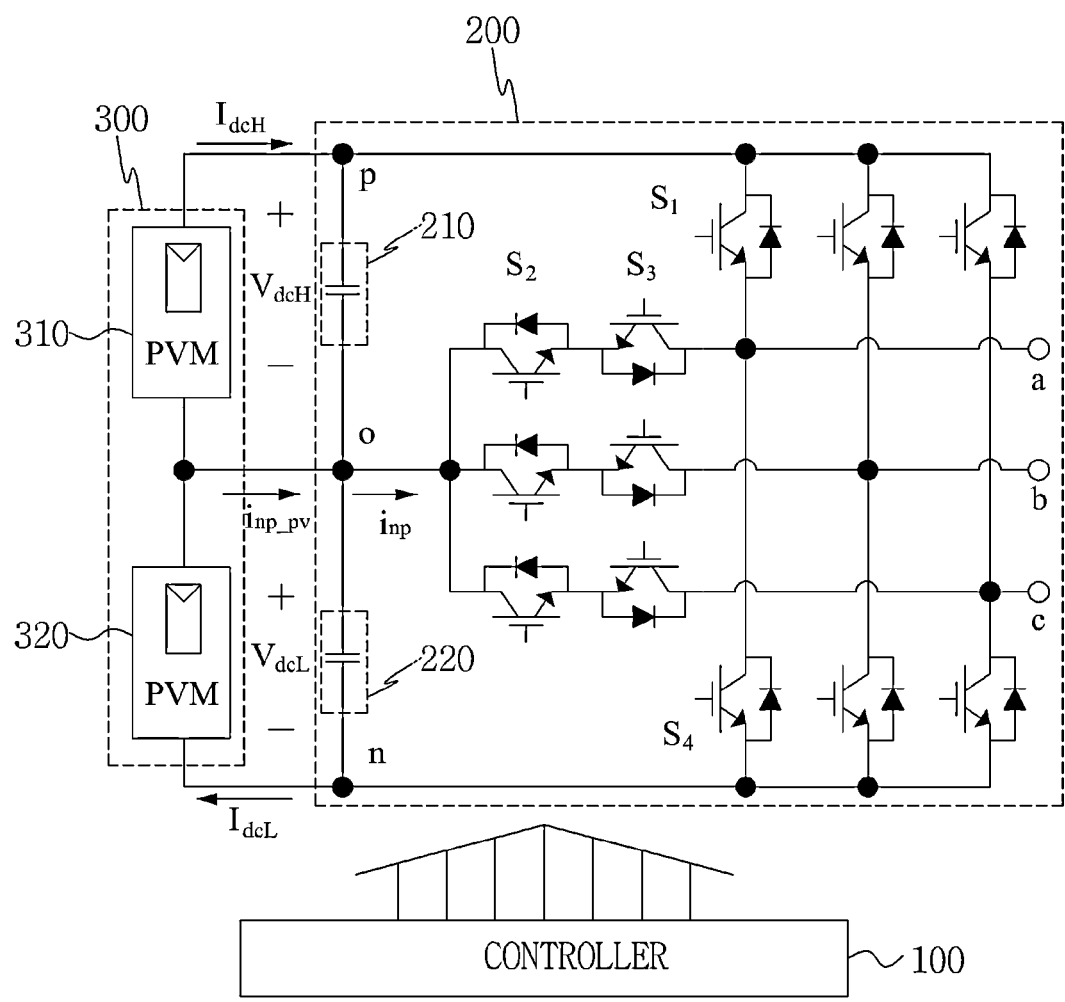
FIG. 3 is a view of a schematic structure of a power generation system including a three-level inverter, according to an embodiment of the present invention.

A power generation system including a three-level inverter 200 according to an embodiment of the present invention is illustrated in FIG. 3. As illustrated in FIG. 3, the power generation system includes a plurality of power generation modules 300, a three-level inverter 200, and a controller 100.

The plurality of power generation modules 300 mean a unit group of elements for generating electricity. In the present embodiment, since a photovoltaic generation system is an example thereof, the power generation modules 300 correspond to photovoltaic (PV) modules. However, the power generation modules 300 are not necessarily limited to the PV modules.

The three-level inverter 200 performs a function of supplying power generated from the PV modules 300 to each phase of a load. In the present embodiment, the three-level inverter 200 has three-phase (a-, b-, and c-phases) output. The three-level inverter 200 includes at least one switching element and has two DC-links, i.e., a first DC-link 210 and a second DC-link 220.

Here, each of the first DC-link 210 and the second DC-link 220 constitutes an input terminal of the three-level inverter 200. A capacitor can be disposed at each DC-link.

One end of the first DC-link 210 (hereinafter, referred to as a 'high-side DC-link') of two DC-links is connected to a first potential point at which a first potential is generated in the PV modules 300.

The first potential point may correspond to an anodic point of the PV module 310 that has a relatively high potential (hereinafter, referred to as a 'high-side PV module') assuming that two PV modules 310 and 320 are connected in series.

Here, connection to the first potential point involves connection via a predetermined element (for example, a diode) in addition to direct connection.

One end of the second DC-link 220 (hereinafter, referred to as 'low-side DC-link') can be connected to a second potential point at which a second potential that is lower than the first potential is generated in the PV modules 310 and 320. For example, assuming that two PV modules 310 and 320 are connected in series, the second potential may correspond to a cathodic point of the PV module 320 that has a relatively low potential (hereinafter, referred to as a 'low-side PV module').

Also, the other end of the first DC-link 210 and the other end of the second DC-link 220 are connected to a third potential point at which a third potential having a medium level between the first potential and the second potential is generated in the PV modules 310 and 320. For example, assuming that two PV modules 310 and 320 are connected in series, the third potential point may correspond to a point where the cathodic point of the high-side PV module 310 intersects with the anodic point of the low-side PV module 320.

That is, both the other end of the high-side DC-link 210 and the other end of the low-side DC-link 220 are connected to the same third potential point.

Hereinafter, a point that is commonly connected to the high-side DC-link 210 and the low-side DC-link 220 ('O' point in FIG. 3) of the three-level inverter 200 is referred to as an 'inverter neutral point'.

According to the related art, no configuration in which the inverter neutral point is connected to the PV modules 300, is disclosed, and this connection configuration is one of main features of the present invention.

The configuration of the switching element of the three-level inverter 200 is not limited to that of FIG. 3 and various configurations may be possible.

The controller 100 performs a function of controlling the three-level inverter 200.

In order to control the three-level inverter 200, a control signal should be applied to a control terminal of each switching element of the three-level inverter 200 (for example, a metal-oxide-semiconductor field-effect transistor (MOSFET)). The controller 100 performs a function of applying the control signal to the switching element in this manner.

For this control, the controller 100 may receive current or/and voltage that is feedback information and is detected at an input terminal and an output terminal of the three-level inverter 200. For example, the controller 100 may receive a terminal voltage of each DC-link 210 or 220 corresponding to the input terminal of the three-level inverter 200 from a predetermined sensor (not shown) and may receive each phase current or phase voltage from a point corresponding to the output terminal of the three-level inverter 200.

The configuration of the sensor for sensing voltage or current in each position of the three-level inverter 200 and a circuit for feeding back a signal to the controller 100 by using the sensor is well-known technology and thus is omitted from FIG. 3 for conveniences.

Figure 4:
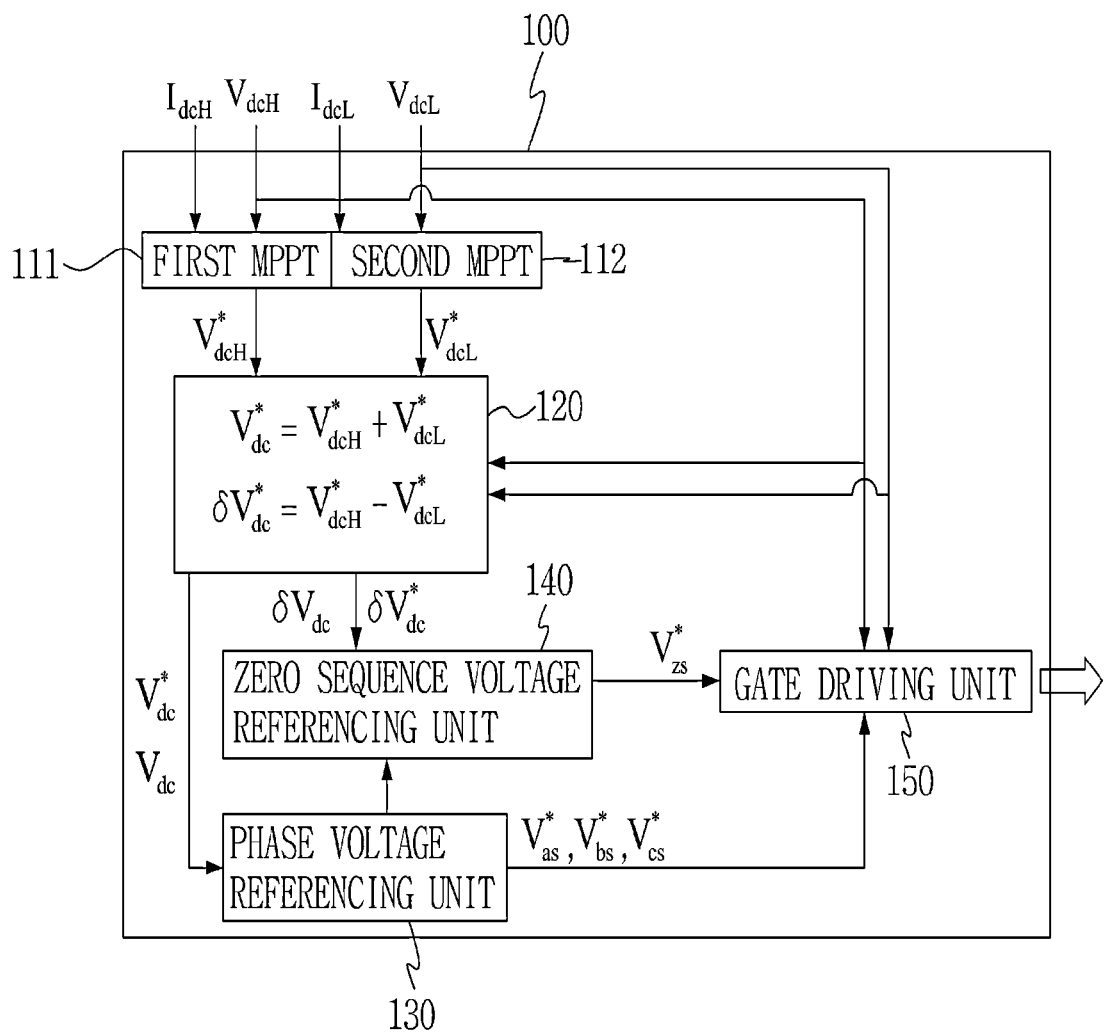
FIG. 4 is a functional block diagram of a controller illustrated in FIG. 3.

A detailed functional block of the controller 100 is illustrated in FIG. 4.

As illustrated in FIG. 4, the controller 100 may include two maximum power point tracking (MPPT) performing units 111 and 112, an arithmetic operation unit 120, a phase voltage referencing unit 130, a zero sequence voltage referencing unit 140, and a gate driving unit 150.

Each MPPT performing unit 111 or 112 performs MPPT separately on each of the DC-links 210 and 220 so as to generate a DC-link voltage reference value.

For example, the first MPPT performing unit 111 generates a high-side DC-link voltage reference value by receiving voltage and current of the high-side DC-link 210, and the second MPPT performing unit 112 generates a low-side DC-link voltage reference value by receiving voltage and current of the low-side DC-link 220.

In this way, separately controlling each DC-link 210 or 220 means asymmetrically controlling a voltage of each DC-link 210 or 220.

Various algorithms can be applied to MPPT that is performed by the first and second MPPT performing units 111 and 112. For example, algorithms based on a perturb and observe (P&O) method and an incremental conductance (IncCond) method can be applied to MPPT. Performing MPPT is well-known and is not a key point of the present invention and thus detailed description thereof will be omitted.

The arithmetic operation unit 120 receives DC-link voltage reference values output from two MPPT performing units 111 and 112 and performs a sum operation and a difference operation of the DC-link voltage reference values. Furthermore, the arithmetic operation unit 120 may receive a high-side DC-link voltage and a low-side DC-link voltage and may perform a sum operation and/or a different operation of each DC-link voltage.

The phase voltage referencing unit 130 generates each phase voltage reference value based on a value that is calculated by the sum operation of the arithmetic operation unit 120. For example, the phase voltage referencing unit 130 may generate each phase voltage reference value by using a sum operation of DC-link voltage reference values and/or a sum operation of DC-link voltages.

In FIG. 4, a phase voltage reference value with respect to the a-phase of FIG. 3 is indicated by $V^*_{as}$, a phase voltage reference value with respect to the b-phase of FIG. 3 is indicated by $V^*_{bs}$, and a phase voltage reference value with respect to the c-phase of FIG. 3 is indicated by $V^*_{cs}$.

A value that is calculated by performing the sum operation of DC-link voltage reference values corresponds to an reference value with respect to the entire DC-links of the three-level inverter 200. In this way, generating each phase reference value based on the reference value with respect to the entire DC-links is a well-known technology and thus detailed description thereof will be omitted.

The zero sequence voltage referencing unit 140 generates a reference value of zero sequence voltages based on the value that is calculated by the difference operation performed by the arithmetic operation unit 120. For example, the zero sequence voltage referencing unit 140 may generate the reference value of zero sequence voltages that is common on each phase, by using the difference operation of the DC-link voltage reference values and/or a difference operation of the DC-link voltages.

In this case, the zero sequence voltage referencing unit 140 may consider the difference operation of the DC-link voltages when a feedback is considered; however, when the feedback is not considered, the zero sequence voltage referencing unit 140 may generate each zero sequence voltage reference value by using only the difference operation of the DC-link voltage reference values. In FIG. 4, the zero sequence voltage reference value generated by the zero sequence voltage referencing unit 140 is indicated by $V^*_{zs}$.

In this case, the zero sequence voltage referencing unit 140 generates a reference value of zero sequence voltages at which a voltage difference between the DC-links 210 and 220 tracks the value calculated by the difference operation of the arithmetic operation unit 120.

Figure 5:
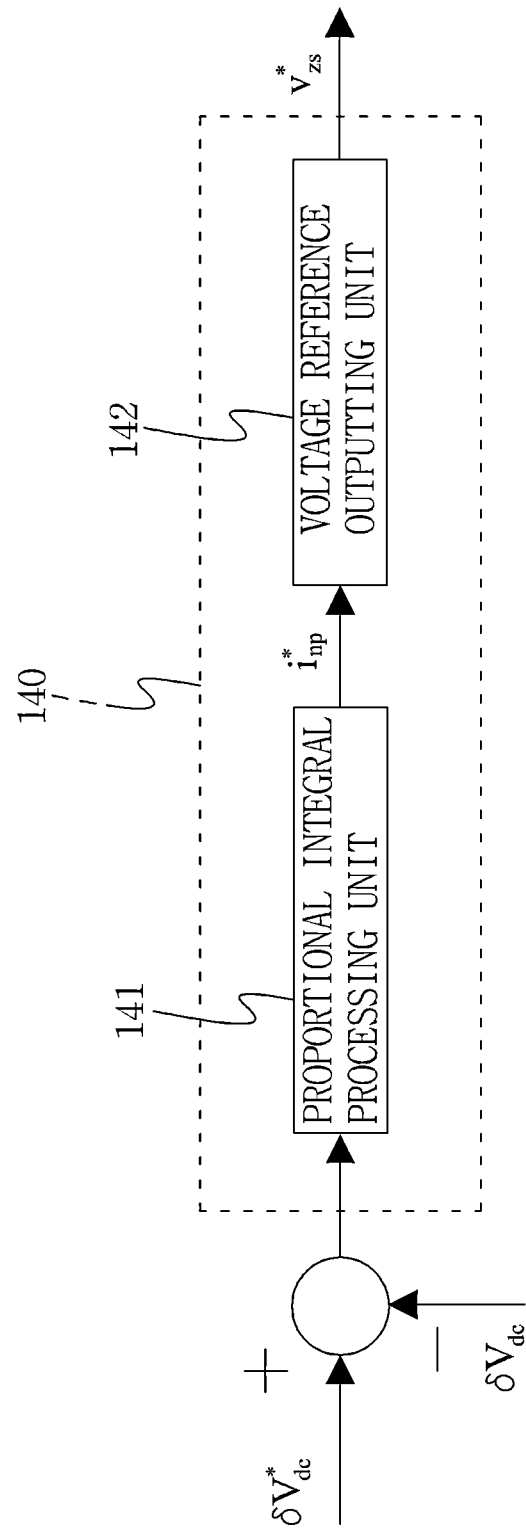
FIG. 5 is a detailed view of a structure of a zero sequence voltage referencing unit illustrated in FIG. 4.

A detailed functional block of the zero sequence voltage referencing unit 140 is illustrated in FIG. 5. As illustrated in FIG. 5, the zero sequence voltage referencing unit 140 may include a proportional integral processing unit 141 and a voltage reference outputting unit 142.

Here, the proportional integral processing unit 141 subtracts the voltage difference between the DC-links 210 and 220 from the value calculated by the difference operation of the arithmetic operation unit 120 and performs proportional integral using predetermined gains on the subtracted value, thereby generating an inverter neutral point current reference value.

Here, the inverter neutral point current is indicated by $i_{np}$ and means a current that flows into the three-level inverter 200 from the inverter neutral point, as illustrated in FIG. 3, and the inverter neutral point reference value means an reference value with respect to the inverter neutral point current and is indicated by $i^*_{np}$.

The voltage reference outputting unit 142 performs a function of generating and outputting a reference value of zero sequence voltages $V^*_{zs}$ by using the inverter neutral point current reference value generated by the proportional integral processing unit 141.

In particular, the voltage reference outputting unit 142 determines a critical point according to each operation state from a graph, whose X-axis is configured of the inverter neutral point current $i_{np}$ and Y-axis is configured by the reference value of zero sequence voltages $V^*_{zs}$, performs linear interpolation using the determined critical point, thereby generating the reference value of zero sequence voltages $V^*_{zs}$ corresponding to the inverter neutral point current reference value $i^*_{np}$ generated by the proportional integral processing unit 141.

When determining a critical point of each operating state, the voltage reference outputting unit 142 may use a sampling period ($T_{samp}$ of FIG. 11), a phase current magnitude, a phase voltage reference value, and magnitudes of DC-link voltages.

An operation of determining the operating state and processing the critical point will now be described in more detail.

Meanwhile, the gate driving unit 150 performs a function of generating a final reference value that is obtained by adding the reference value of zero sequence voltages calculated by the zero sequence voltage referencing unit 140 to each phase voltage reference value of the phase voltage referencing unit 130 and of applying a signal using the final reference value to each gate of the switching element of the three-level inverter 200.

In this case, the gate driving unit 150 may generate a pulse width modulation (PWM) signal by using a carrier whose magnitude is dynamically altered according to each DC-link voltage and the above-described final reference value and may apply the PWM signal to each gate of the switching element.

This is to assist separate control of voltages of the DC-links 210 and 220.

Figure 6:
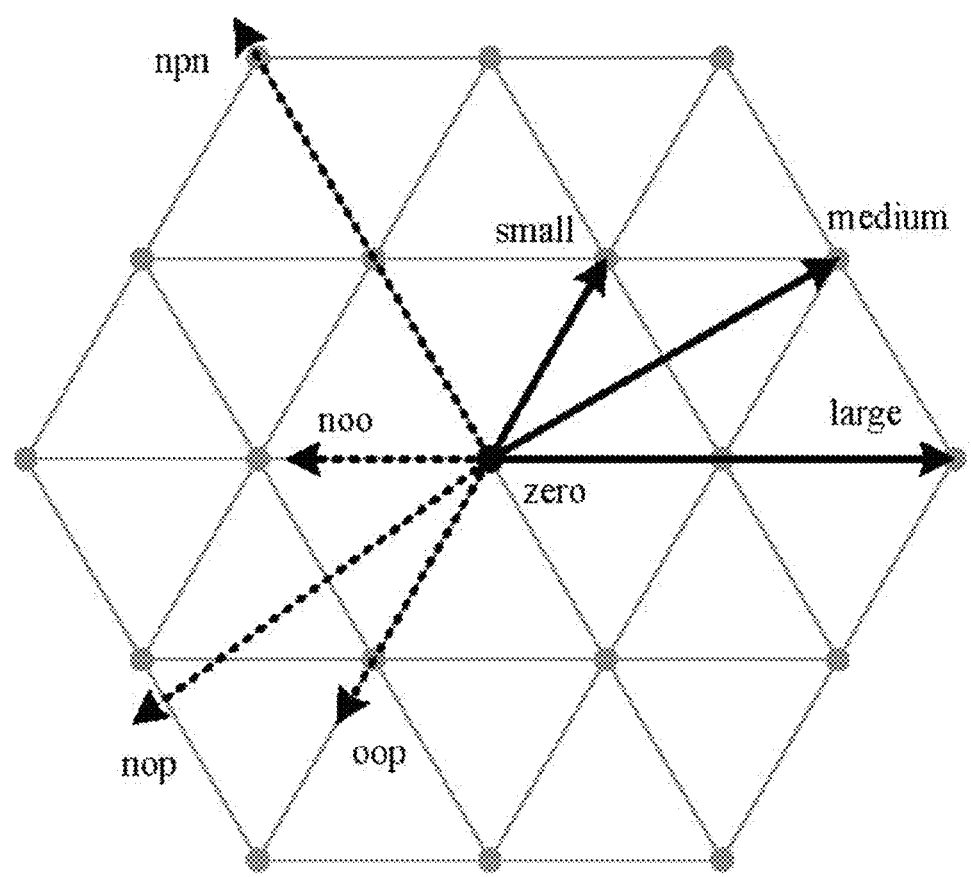
FIG. 6 is a view of voltage output states of a three-level inverter indicated by using voltage vectors.

FIG. 6 illustrates voltage output states of the three-level inverter 200 by using voltage vectors.

When a voltage of the high-side DC-link and a voltage of the low-side DC-link are the same, three-phase voltage output can be expressed as one of vertexes in a hexagonal plane filled with an equilateral triangle. That is, these vectors can be classified into zero vector, small vector, medium vector, and large vector by their magnitude.

When $V_{dc}(=V_{dcH}+V_{dcL})$ increases by 10% and the ratio between $V_{dcH}$ and $V_{dcL}$ is 6:4, the voltage vectors deviate from the vertexes like dotted line vectors of FIG. 6. Potentials of 'p', 'o', and 'n' are as defined in FIG. 3.

A complicated operation based on a trigonometrical function should be performed so as to geometrically compensate for this distortion in a voltage plane. However, compensation for asymmetric voltages of the DC-links 210 and 220 can be easily understood in relation to the carrier-based PWM.

Figure 7:
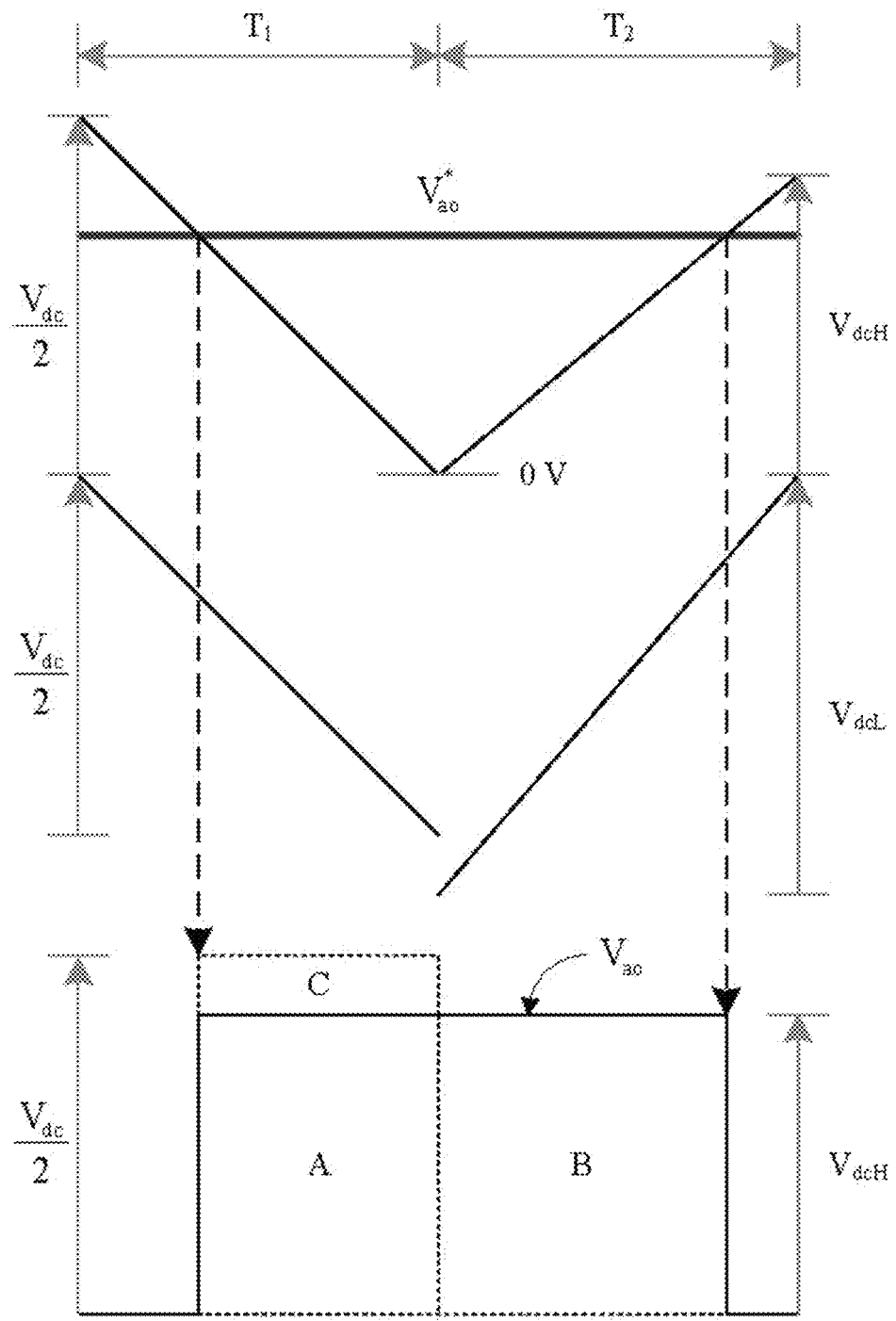
FIG. 7 is a reference view for carrier control.

FIG. 7 illustrates the case where the final reference value $V^*_{ao}$ in relation to the a-phase intersects with the high-side carrier. In FIG. 7, ($S_2,S_4$) of FIG. 3 is fixed as (ON, OFF), and the switching state of ($S_1,S_3$) is altered by comparing $V^*_{ao}$ with the carrier.

Hereinafter, it is assumed that the high-side/low-side DC-link voltages of the three-level inverter 200 are different from each other during intervals of $T_1$ and $T_2$ of FIG. 7.

First, the asymmetric voltage plane of FIG. 6 is assumed during the interval of $T_1$, and the half of measured $V_{dc}$ is applied to the height of the high-side/low-side carrier.

Initially, the intended output of a-phase volt-second during $T_1$ is supposed to be area sum of A and C; however, $V_{dcH}$ that is an actual high-side capacitor voltage is smaller than $V_{dc}/2$ and a loss corresponding to the area C occurs.

During the interval of $T_2$, the amplitudes of the high-side and low-side carriers are adjusted to be proportional to the high-side/low-side DC-link voltages so as to compensate for this loss. In this case, the instant that the final reference value and the carrier intersect with each other, is delayed so that the volt-second output increases and the area B that is the same as the area sum of A and C can be output. Thus, the entire carrier heights are adjusted in such a way that the high-side carrier is adjusted to be proportional to the voltage magnitude of $V_{dcH}$ and the low-side carrier is adjusted to be proportional to the voltage magnitude of $V_{dcL}$ so that distortion of the voltage output can be easily compensated for.

Hereinafter, the theoretical background that the voltage difference between the actual DC-links 210 and 220 is adjusted by the zero sequence voltage referencing unit 140 of FIG. 4 will be described.

The voltage vectors with reference to FIG. 6 have been mentioned to be classified into four types by their magnitude. When an R-L load (resistance-coil load) is connected to the three-level inverter 200 of FIG. 3, circuit connection corresponding to each voltage vector is as shown in FIG. 8.

Figure 8:
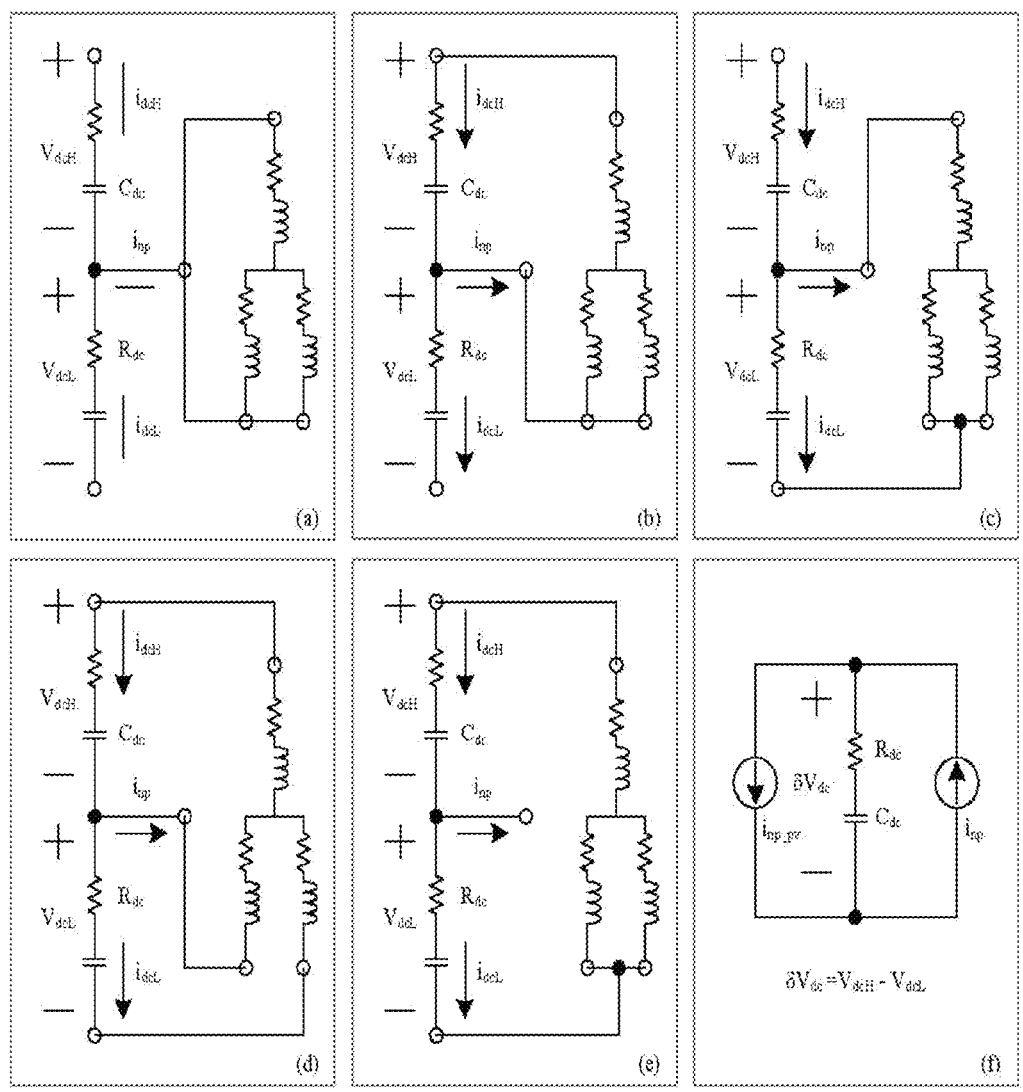
FIG. 8 is a view showing topological example circuits for each voltage vector and an equivalent circuit for $\delta V_{dc}$ when an R-L load is connected to the three-level inverter.

As known from (b) and (c) of FIG. 8, small vectors are categorized into two. Although connection states of the load are the same, the load can be connected to a high-side capacitor (i.e., a capacitor included in the high-side DC-link 210) of the three-level inverter 200 or a low-side capacitor (i.e., a capacitor included in the low-side DC-link 220) of the three-level inverter 200.

Here, hints for inverter neutral point voltage control can be obtained. It is assumed that the load is connected to an ideal voltage source so that the sum of the entire DC-link voltages is constant and L of the load is small so that a power factor is close to 1. Then, in (b) of FIG. 8, an effective power that is consumed by the load is involved in the high-side capacitor so that inverter neutral point potentials increase. Contrary to this, in (c) of FIG. 8, the low-side capacitor involves the effective power of the load so that the inverter neutral point potentials decrease.

That is, in (b) and (c) of FIG. 8, although the connection states of the load are the same, effects on the inverter neutral point potentials are opposite to each other. However, the ratio between (b) and (c) of FIG. 8 of voltage output can be limitedly adjusted by using the zero sequence voltages added to the phase voltage reference value. Thus, by using the zero sequence voltages, the potentials of the inverter neutral point can be regulated in a limited range.

The above analysis is a qualitative analysis in relation to output power. A voltage variation of the capacitor can be expressed as functions relating to the current flowing through the capacitor in a mathematical manner. The voltage and current of the high-side/low-side capacitor having an equivalent series resistance (ESR) of $R_{dc}$ have the following relationship. Associated variables are as defined in FIG. 8.

$$V_{dcH}(t) = V_{dcH0} + R_{dc} \cdot i_{dcH}(t) + \frac{1}{C_{dc}} \int_0^t i_{dcH}(t) dt \qquad (1)$$

$$V_{dcL}(t) = V_{dcL0} + R_{dc} \cdot i_{dcL}(t) + \frac{1}{C_{dc}} \int_0^t i_{dcL}(t) dt \qquad (2)$$

In addition, in FIG. 4, the following (3) is established by the Kirchhoff's Current Law (KCL).

$$i_{dcH}(t) - i_{dcL}(t) = i_{np}(t) \qquad (3)$$

In order to analyze the effect of $i_{np}$ based on (3), (2) can be subtracted from (1).

$$\delta V_{dc}(t) = V_{dcH}(t) - V_{dcL}(t) \qquad (4)$$

$$= V_{dcH0} - V_{dcL0} + R_{dc} \cdot i_{np}(t) + \frac{1}{C_{dc}} \int_0^t i_{np}(t) dt$$

The voltage vectors in all cases can be expressed as the equivalent circuit of (f) of FIG. 8 based on (4). Since a feedback control loop control object has been equivalent-modeled based on (f) of FIG. 8, a feedback control loop for $\delta V_{dc}$ can be configured as illustrated in FIG. 9.

Figure 9:
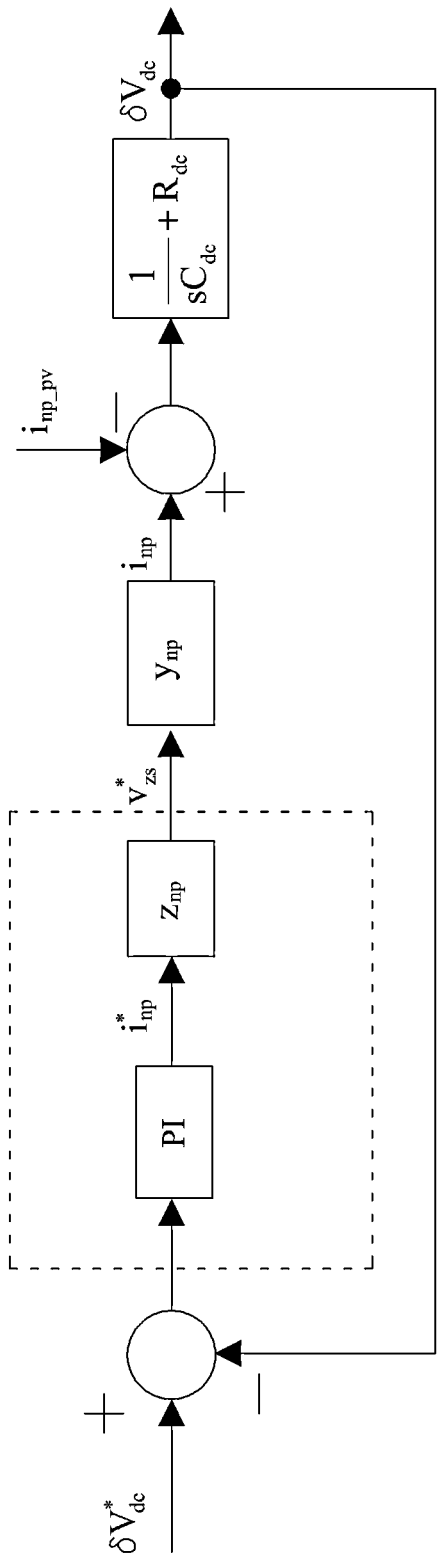
FIG. 9 is an example of a feedback control loop according to the present invention.

A box enclosed by the dotted line in FIG. 9 indicates the above-described zero sequence voltage referencing unit 140.

In order to easily select PI gains in general situations, the following conditions are assumed.

$$i_{np\_pv} = 0 \qquad (5)$$

$$Z_{np} \cdot y_{np} = 1 \qquad (6)$$

$Z_{np}$ in FIG. 9 means an operation of generating a necessary reference value of zero sequence voltages $V^*_{zs}$ by receiving $i^*_{np}$. Although not shown, an operation of limiting the magnitude of $i^*_{np}$ to a predetermined range by using a limiter that limits the magnitude of a signal physically may be further included. $Z_{np}$ means an operation performed by the above-described voltage reference outputting unit 142.

$y_{np}$ means that the inverter neutral point current is generated by an actual PWM signal defined by the reference value of zero sequence voltages, 3-phase voltage reference value, the DC-link voltage, and the sampling period, and an actual 3-phase output current. That is, $y_{np}$ corresponds to system characteristics and thus may vary according to systems.

Figure 10:
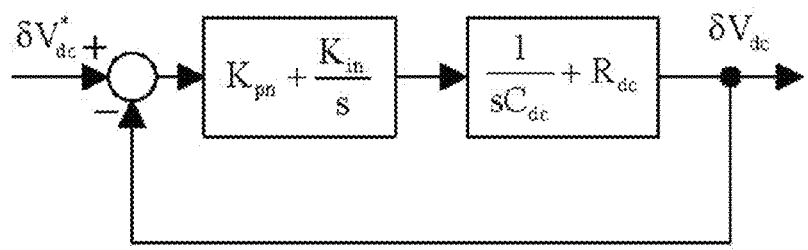
FIG. 10 is a schematic view of the feedback control loop illustrated in FIG. 9.

When (5) and (6) are satisfied, the control loop of FIG. 9 can be simply expressed, as shown in FIG. 10.

A transfer-function can be derived from FIG. 10. If (7) is satisfied with (8), the transfer-function is derived as (9)

$$R_{dc} K_{pn} \approx 0 \ \& \ K_{pn}/K_{in} \gg R_{dc} C_{dc} \qquad (7)$$

$$\begin{cases} K_{pn} = 2\zeta\omega_n \cdot C_{dc} \\ K_{in} = C_{dc}\omega_n^2 \end{cases} \qquad (8)$$

$$\frac{\delta V_{dc}}{\delta V^*_{dc}} = \frac{s \cdot 2\zeta\omega_n + \omega_n^2}{s^2 + s \cdot 2\zeta\omega_n + \omega_n^2} \qquad (9)$$

That is, when the PI gains are set to the values represented in (8), the characteristics of (9) can be obtained, and a control bandwidth can be regulated by $\omega_n$.

Hereinafter, an example of a detailed operation of determining a critical point according to each operating state and of generating a reference value of zero sequence voltages by using the above-described voltage reference outputting unit 142 will be described.

Figure 11:
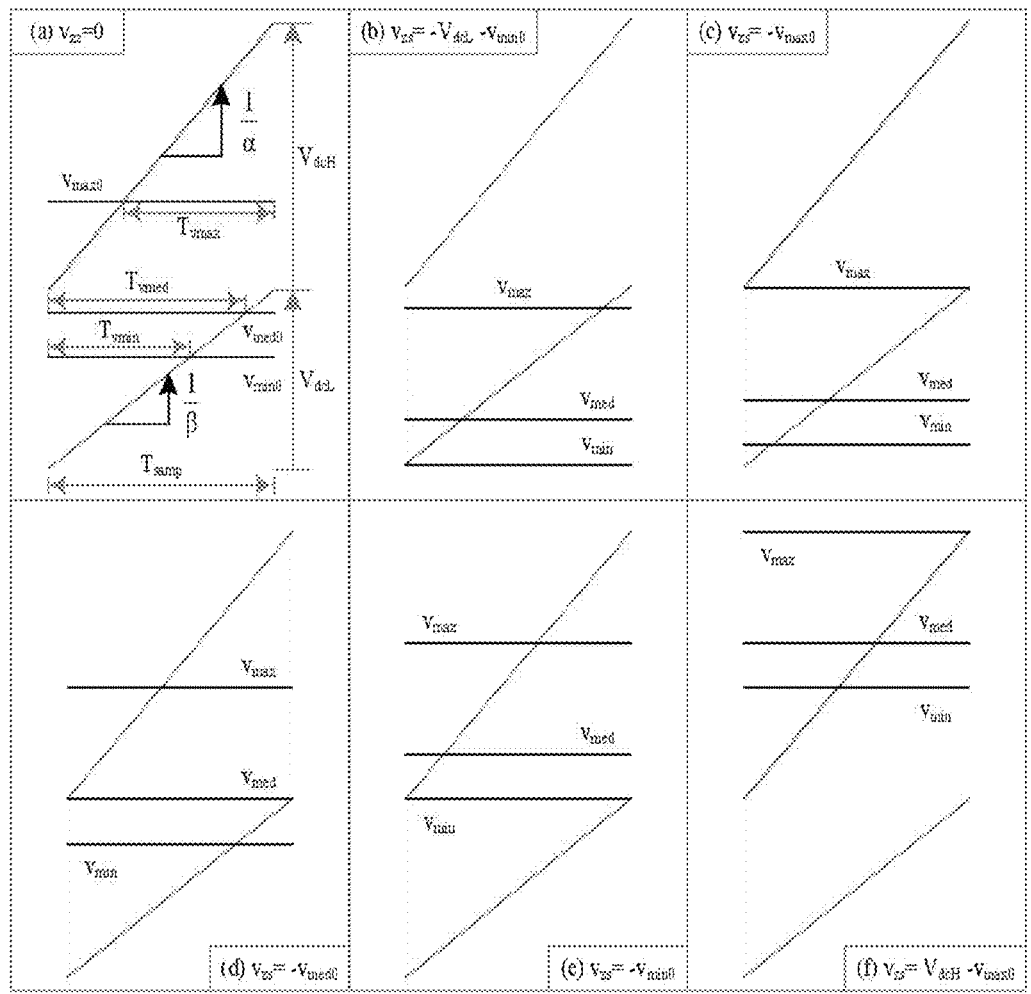
FIG. 11 is a view showing the relationship between the carrier and a final reference value according to a reference value of zero sequence voltages.

First, FIG. 11 shows the relationship between the reference value of zero sequence voltages and the final reference value.

In FIG. 11, $V_{zs}$ is a reference value of zero sequence voltages, $V_{max}$ is a reference having a maximum value among phase final references, $V_{med}$ is a reference having a medium value among phase final references, and $V_{min}$ is a reference having a minimum value among phase final references. $V_{max0}$, $V_{med0}$, and $V_{min0}$ are phase voltage reference values when $V_{zs}=0$.

For example, (a) of FIG. 11 represents final reference values when $V_{zs}$ is 0, and these reference values of (a) of FIG. 11 are also phase voltage reference values, because $V_{zs}$ is 0.

$\alpha$ and $\beta$ of (a) of FIG. 11 are defined as follows.

$$\alpha = T_{samp}/V_{dcH}, \beta = T_{samp}/V_{dcL} \quad (10)$$

An average inverter neutral point current during one sampling period is expressed as follows.

$$I_{np} = \frac{1}{T_{samp}}(T_{vmax} \cdot i_{vmax} + T_{vmed} \cdot i_{vmed} + T_{vmin} \cdot i_{vmin}) \quad (11)$$

$T_{vmax}$ is the time where $V_{max}$ is below the high-side carrier and above the low-side carrier, as defined in (a) of FIG. 11, $i_{vmax}$ is a current magnitude of a phase corresponding to $V_{max}$ among the a-, b-, and c phases, $i_{vmed}$ is a current magnitude of a phase corresponding to $V_{med}$ among the a-, b-, c-phases, and $i_{vmin}$ is a current magnitude of a phase corresponding to $C_{min}$ among the a-, b-, and c-phases.

When there is a variation of the reference value of zero sequence voltages $\delta V_{zs}$ that is positively defined, $T_{vmax}$ is decreased by $\alpha \cdot \delta V_{zs}$ according to the proportional relationship in (a) of FIG. 11.

It is assumed that, when the reference value of zero sequence voltages is $-V_{dcL}-V_{min0}$, as illustrated in (b) of FIG. 11, an inverter neutral point current is $I_{np\_b0}$. When the reference value of zero sequence voltages is altered by $\delta V_{zs}$ that is positive increment and the final reference value varies from (b) to (c) of FIG. 11, an inverter neutral point current $I_{np\_bc}$ is expressed as follows. Here, the sum of 3-phase currents can be assumed as 0 on the assumption that the neutral point of the load is not connected to the outside.

$$I_{np\_bc} = I_{np\_b0} + \frac{\delta V_{zs}}{T_{samp}}(\beta \cdot i_{vmax} + \beta \cdot i_{vmed} + \beta \cdot i_{vmin}) \quad (12)$$

$$= I_{np\_b0} + \frac{\beta \cdot \delta V_{zs}}{T_{samp}}(i_{vmax} + i_{vmed} + i_{vmin}) = I_{np\_b0}$$

Similarly, current variations in respective cases indicated in FIG. 11 are as follows.

$$I_{np\_cd} = I_{np\_c0} + \frac{\delta V_{zs}}{T_{samp}}(-\alpha \cdot i_{vmax} + \beta \cdot i_{vmed} + \beta \cdot i_{vmin}) \quad (13)$$

$$= I_{np\_b0} + \frac{\beta \cdot \delta V_{zs}}{T_{samp}}(i_{vmax} + i_{vmed} + i_{vmin}) - \frac{\delta V_{zs}}{T_{samp}}(\alpha + \beta) \cdot i_{vmax}$$

$$= I_{np\_c0} - \frac{\delta V_{zs}}{T_{samp}}(\alpha + \beta) \cdot i_{vmax}$$

$$I_{np\_de} = I_{np\_d0} + \frac{\delta V_{zs}}{T_{samp}}(-\alpha \cdot i_{vmax} + \alpha \cdot i_{vmed} + \beta \cdot i_{vmin}) \quad (14)$$

$$= I_{np\_d0} - \frac{\alpha \cdot \delta V_{zs}}{T_{samp}}(i_{vmax} + i_{vmed} + i_{vmin}) + \frac{\delta V_{zs}}{T_{samp}}(\alpha + \beta) \cdot i_{vmin}$$

$$= I_{np\_d0} + \frac{\delta V_{zs}}{T_{samp}}(\alpha + \beta) \cdot i_{vmin}$$

$$I_{np\_ef} = I_{np\_e0} + \frac{\delta V_{zs}}{T_{samp}}(-\alpha \cdot i_{vmax} - \alpha \cdot i_{vmed} - \alpha \cdot i_{vmin}) \quad (15)$$

$$= I_{np\_e0} - \frac{\alpha \cdot \delta V_{zs}}{T_{samp}}(i_{vmax} + i_{vmed} + i_{vmin}) = I_{np\_e0}$$

According to the above (12) to (15), variations of the reference value of zero sequence voltages corresponding to an interval between (b) and (c) of FIG. 11 and an interval between (e) and (f) of FIG. 11 do not affect variations of the average inverter neutral point current. The inverter neutral point current varies during an interval between (c) and (d) of FIG. 11 or an interval between (d) and (e) of FIG. 11. Assuming that magnitudes of output phase currents during the sampling period are nearly constant, the inverter neutral point current varies linearly and in proportion to the reference value of zero sequence voltages.

Since the values such as $\delta V_{zs}$, $T_{samp}$, $\alpha$, and $\beta$ are all positively defined, an increase or a decrease in the inverter neutral point current depends on signs of $i_{vmax}$ and $i_{vmin}$. A slope of the variation of the inverter neutral point current varies depending on phase current magnitudes, it is assumed that $|i_{vmax}|>|i_{vmin}|$, for example.

FIG. 12 shows several examples of variations in inverter neutral point currents according to output phase current signs.

Referring to FIG. 12, the X-axis represents a reference value of zero sequence voltages, and the Y-axis represents an average value of the inverter neutral point currents. Also, $V_{zs\_min0}$ corresponds to $-V_{dcL}-V_{min0}$ of (b) of FIG. 11, and $V_{zs\_max0}$ corresponds to $V_{dcH}-V_{max0}$ of (f) of FIG. 11.

In FIG. 12, initial current values $I_{np\_c0}$, $I_{np\_d0}$, and $I_{np\_e0}$ of (13) to (15) are indicated by inflection points A, B, and C. The slope of variation of the inverter neutral point current may vary according to a relative difference in absolute values of $I_{vmax}$ and $I_{vmin}$. Referring to (a) and (b) of FIG. 12, the shape of graphs varies according to operating states.

In this way, if graph can be defined according to each operating state, a reference value of zero sequence voltages corresponding to a given inverter neutral point current reference value can be calculated. To this end, linear interpolation can be used.

That is, if graph is defined according to each operating state, the reference value of zero sequence voltages corresponding to a point where the inverter neutral point reference value ($i^*_{np}$ of FIG. 9) and the graph intersect with each other, can be calculated, as illustrated in (a) and (b) of FIG. 12.

A detailed operation of using linear interpolation will be described as below.

If the reference value of zero sequence voltages is defined, an average inverter neutral point current magnitude can be computed in consideration of the proportional relationship of FIG. 11.

In (a) of FIG. 12, after the inverter neutral point current magnitude of a point A' where the reference value of zero sequence voltages is $V_{zs\_min0}$ and a point B' where the reference value of zero sequence voltages is $V_{zs\_max0}$ is calculated, linear interpolation between the points A' and B' is performed to define graph in corresponding operating state. That is, critical points for linear interpolation are the points A' and B', respectively.

If graph is defined in this way, the reference value of zero sequence voltages corresponding to the point where graph and $i*_{np}$ intersect with each other, can be calculated.

However, (b) of FIG. 12 is slightly different from (a) of FIG. 12.

In (b) of FIG. 12, if linear interpolation is performed using the critical points of the points A' where the reference value of zero sequence voltages is $V_{zs\_min0}$ and the point B' where the reference value of zero sequence voltages is $V_{zs\_max0}$, graph corresponding to a dotted line of (b) of FIG. 12 is derived. In this case, a point where the corresponding graph and $i*_{np}$ intersect with each other, is not P but P'. This is because the critical points for linear interpolation are wrongly set.

Thus, it is significant to determine the critical points for linear interpolation according to an operating state. In (b) of FIG. 12, the critical points for linear interpolation should not be the points A' and B' but should be points A and B'.

The phase voltage reference value, the sampling period, each phase current magnitude, and each DC-link voltage magnitude can be used to calculate the critical points according to each operating state, as described above.

For example, in (b) of FIG. 12, when a value obtained by adding $V_{max\_0}$ to $V_{zs\_min0}$ is smaller than 0, a critical point for linear interpolation can be set as A instead of A'. In this case, the reference value of zero sequence voltages at the point A is $-V_{max0}$.

By the above-described control, two DC-link voltages included in the three-level inverter 200 are separately controlled so that improved maximum power compared to the related art can be supplied to the load when partial shades occur.

Figure 13:
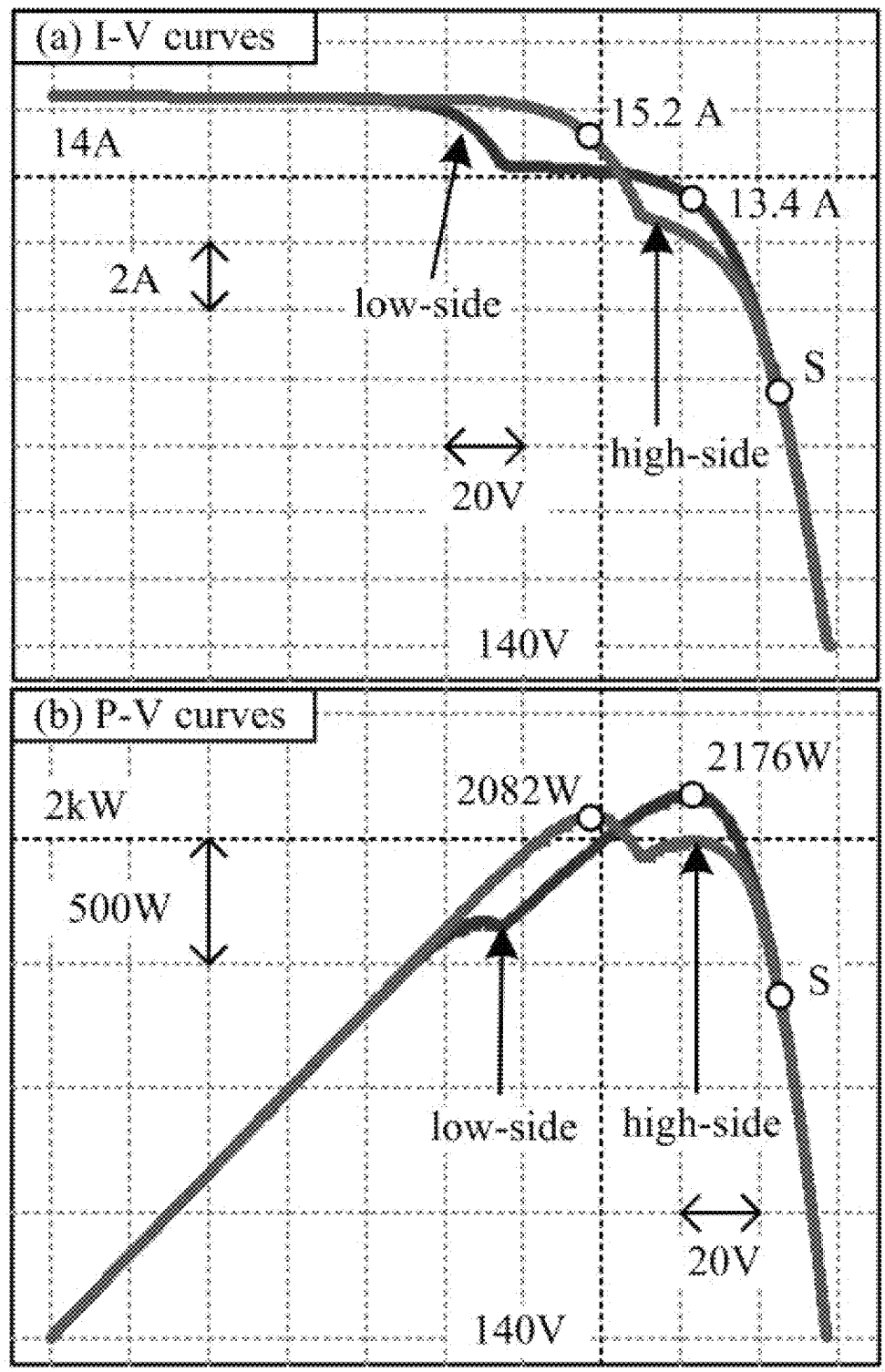
FIG. 13 is a current-voltage curve and a power-voltage characteristic curve when maximum power point tracking (MPPT) according to the present invention is performed in given shading conditions.

FIG. 13 is a current-voltage curve and a power-voltage characteristic curve when MPPT according to the present invention is performed when partial shades occur in 5000 W PV modules 300.

Referring to (b) of FIG. 13, as a result of performing MPPT, the entire power that can be supplied to the load is 4258 W(=2082+2176).

Figure 14:
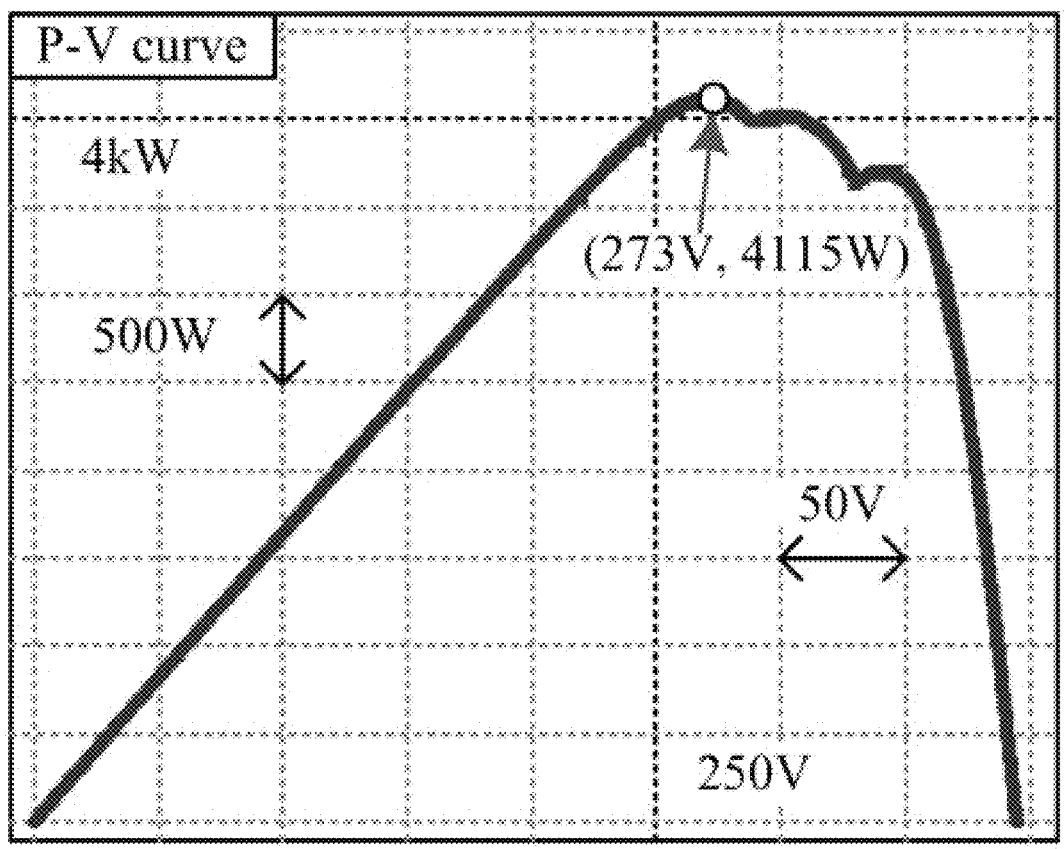
FIG. 14 shows the result of MPPT performed according to the related art in the same shading conditions as those of FIG. 13.

The result of performing MPPT by using a conventional method in a state where a path on which $i_{np\_pv}$ of FIG. 3 flows, is removed on the same conditions is shown in FIG. 14. Referring to FIG. 14, when MPPT is performed using the conventional method, maximum power that can be supplied to the load is 4115 W.

Comparing FIG. 13 with FIG. 14, when the three-level inverter 200 is configured by the method according to the present invention and voltages of the DC-links 210 and 220 are separately controlled, power increased by 3.5% compared to the conventional method can be supplied to the load.

As described above, according to the present invention, when partial shades occur in PV modules, the magnitude of power that can be supplied to the load from the PV modules can be increased.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An apparatus for controlling a three-level inverter having two direct current (DC)-links for converting DC power generated in a plurality of photovoltaic (PV) modules into alternating current (AC) power,
   wherein one end of a first DC-link of the two DC-links is connected to a first potential point at which a first potential is generated in the plurality of PV modules, and
   one end of a second DC-link of the two DC-links is connected to a second potential point at which a second potential that is lower than the first potential is generated in the plurality of PV modules, and
   both an other end of the first DC-link and an other end of the second DC-link are connected to a third potential point at which a third potential having a medium level between the first potential and the second potential is generated in the plurality of PV modules,
   the apparatus comprising:
      two maximum power point tracking (MPPT) performing units for performing MPPT separately on each of the two DC-links to respectively generate DC-link voltage reference value;
      an arithmetic operation unit for performing a sum operation and a difference operation of each of the DC-link voltage reference values by receiving the DC-link voltage reference values output from the two MPPT performing units;
      a phase voltage referencing unit for generating each phase voltage reference value based on a value calculated by performing the sum operation of the arithmetic operation unit;
      a zero sequence voltage referencing unit for generating a reference value of zero sequence voltages based on a value calculated by performing the difference operation of the arithmetic operation unit; and
      a gate driving unit for generating a final reference value that is obtained by adding the reference value of zero sequence voltages calculated by the zero sequence voltage referencing unit to each phase voltage reference value of the phase voltage referencing unit and for applying a signal using the final reference value to each gate of a switching element of the three-level inverter.

2. The apparatus of claim 1, wherein the zero sequence voltage referencing unit generates a reference value of zero sequence voltages at which a voltage difference between the DC-links tracks the value calculated by the difference operation of the arithmetic operation unit.

3. The apparatus of claim 2, wherein the zero sequence voltage referencing unit comprises:
   a proportional integral processing unit for subtracting the voltage difference between the DC-links from the value calculated by the difference operation of the arithmetic operation unit, for performing proportional integral using predetermined gains on the subtracted value, and for generating an inverter neutral point current reference value; and
   a voltage reference outputting unit for generating and outputting a reference value of zero sequence voltages by using the inverter neutral point current reference value generated by the proportional integral processing unit.

4. The apparatus of claim 3, wherein the voltage reference outputting unit determines a critical point according to each operation state from a graph, whose X-axis is configured of the inverter neutral point current and Y-axis is configured by the reference value of zero sequence voltages, performs linear interpolation using the determined critical point, thereby generating the reference value of zero sequence voltages corresponding to the inverter neutral point current reference value generated by the proportional integral processing unit.

5. The apparatus of claim 4, wherein, when determining the operating state and calculating the critical point, the voltage reference outputting unit uses the phase voltage reference value, a sampling period, each phase current magnitude, and each DC-link voltage magnitude.

6. The apparatus of claim 1, wherein the zero sequence voltage referencing unit comprises:
   a proportional integral processing unit for subtracting the voltage difference between the DC-links from the value calculated by the difference operation of the arithmetic operation unit, for performing proportional integral using predetermined gains on the subtracted value, and for generating an inverter neutral point current reference value; and
   a voltage reference outputting unit for generating and outputting a reference value of zero sequence voltages by using the inverter neutral point current reference value generated by the proportional integral processing unit.

7. The apparatus of claim 6, wherein the voltage reference outputting unit determines a critical point according to each operation state from a graph, whose X-axis is configured of the inverter neutral point current and Y-axis is configured by the reference value of zero sequence voltages, performs linear interpolation using the determined critical point, thereby generating the reference value of zero sequence voltages corresponding to the inverter neutral point current reference value generated by the proportional integral processing unit.

8. The apparatus of claim 7, wherein, when determining an operating state and calculating the critical point, the voltage reference outputting unit uses the phase voltage reference value, a sampling period, each phase current magnitude, and each DC-link voltage magnitude.

9. The apparatus of claim 1, wherein the gate driving unit generates a pulse width modulation (PWM) signal by using a carrier whose magnitude is dynamically altered according to each DC-link voltage and the final reference value and applies the PWM signal to each gate of the switching element.

10. A method of controlling the three-level inverter having two DC-links of claim 1, the method comprising:
   (a) performing maximum power point tracking (MPPT) separately on each of the two DC-links to respectively generate DC-link voltage reference values;
   (b) performing a sum operation and a difference operation of each of the DC-link voltage reference values by receiving the DC-link voltage reference values generated in (a);
   (c) generating each phase voltage reference value based on a value calculated by performing the sum operation of (b);
   (d) generating a reference value of zero sequence voltages based on a value calculated by performing the difference operation of (b); and
   (e) generating a final reference value that is obtained by adding the reference value of zero sequence voltages calculated in (d) to each phase voltage reference value calculated in (c) and applying a signal using the final reference value to each gate of the switching element of the three-level inverter.

11. The method of claim 10, wherein (d) comprises generating a reference value of zero sequence voltages at which a voltage difference between the DC-links tracks the value calculated by the difference operation of (b).

12. The method of claim 11, wherein (d) comprises:
   (d1) subtracting the voltage difference between the DC-links from the value calculated by the difference operation of (b), performing proportional integral using predetermined gains on the subtracted value, and generating an inverter neutral point current reference value; and
   (d2) generating and outputting a reference value of zero sequence voltages by using the inverter neutral point current reference value generated in (d1).

13. The method of claim 12, wherein (d2) comprises:
   determining a critical point according to each operation state from a graph, whose X-axis is configured of the inverter neutral point current and Y-axis is configured by the reference value of zero sequence voltages; and
   performing linear interpolation using the determined critical point, thereby generating the reference value of zero sequence voltages corresponding to the inverter neutral point current reference value generated in (d1).

14. The method of claim 13, wherein the phase voltage reference value, a sampling period, each phase current magnitude, and each DC-link voltage magnitude are used in determining the operating state and calculating the critical point.

15. The method of claim 10, wherein (d) comprises:
   (d1) subtracting the voltage difference between the DC-links from the value calculated by the difference operation of (b), performing proportional integral using predetermined gains on the subtracted value, and generating an inverter neutral point current reference value; and
   (d2) generating and outputting a reference value of zero sequence voltages by using the inverter neutral point current reference value generated in (d1).

16. The method of claim 15, wherein (d2) comprises:
   determining a critical point according to each operation state from a graph, whose X-axis is configured of the inverter neutral point current and Y-axis is configured by the reference value of zero sequence voltages; and
   performing linear interpolation using the determined critical point, thereby generating the reference value of zero sequence voltages corresponding to the inverter neutral point current reference value generated in (d1).

17. The method of claim 16, wherein the phase voltage reference value, a sampling period, each phase current magnitude, and each DC-link voltage magnitude are used in determining an operating state and calculating the critical point.

18. The method of claim 10, wherein (e) comprises:
   (e1) generating a pulse width modulation (PWM) signal by using a carrier whose magnitude is dynamically altered according to each DC-link voltage and the final reference value; and
   (e2) applying the PWM signal generated in (e1) to each gate of the switching element.

* * * * *